United States Patent
Brunn et al.

(10) Patent No.: US 9,503,138 B2
(45) Date of Patent: Nov. 22, 2016

(54) INTERFERENCE CANCELLATION

(71) Applicant: Marvell World Trade Ltd., St. Michael (BB)

(72) Inventors: Brian T. Brunn, Bee Cave, TX (US); Rangakrishnan Srinivasan, Austin, TX (US); Gregory T. Uehara, Kailua, HI (US); Marc Leroux, Austin, TX (US); Zhiguo Wang, Austin, TX (US); Jari Juhani Vahe, Austin, TX (US); Rohit Mainkar, Austin, TX (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/937,821

(22) Filed: Nov. 10, 2015

(65) Prior Publication Data
US 2016/0134315 A1    May 12, 2016

Related U.S. Application Data

(60) Provisional application No. 62/078,183, filed on Nov. 11, 2014, provisional application No. 62/205,135, filed on Aug. 14, 2015.

(51) Int. Cl.
*H04B 1/10* (2006.01)
*H04B 1/12* (2006.01)

(52) U.S. Cl.
CPC ............ *H04B 1/1036* (2013.01); *H04B 1/123* (2013.01)

(58) Field of Classification Search
CPC ........ H04B 1/10; H04B 1/1027; H04B 1/62; H04B 15/00; H04B 15/005; H04B 15/02; H04B 15/04
USPC ....... 375/343, 316, 346, 350, 259, 260, 278, 375/284, 285
See application file for complete search history.

(56) References Cited

U.S. PATENT DOCUMENTS

| | | |
|---|---|---|
| 2006/0239389 A1 | 10/2006 | Coumou |
| 2010/0266000 A1 | 10/2010 | Froimovich et al. |
| 2011/0065409 A1 | 3/2011 | Kenington |
| 2012/0170691 A1 | 7/2012 | Lima et al. |
| 2012/0264381 A1* | 10/2012 | Eisenhut ............... H04B 1/406 455/90.1 |
| 2016/0006468 A1* | 1/2016 | Gale ..................... H04B 1/123 455/296 |

FOREIGN PATENT DOCUMENTS

GB    2508398 A  *  6/2014  .......... H04B 1/1036
KR  10-2009-0061678 A    6/2009

OTHER PUBLICATIONS

International Search Report and Written Opinion for PCT/US2015/060037, filed Nov. 10, 2015.

* cited by examiner

*Primary Examiner* — Siu Lee

(57) ABSTRACT

A circuit comprises a vector separator circuit to generate a first extracted signal according to (i) a first correlation signal, (ii) a second correlation signal, and (iii) a relative response signal. The first correlation signal corresponds to a first correlation between an input signal and a first test signal. The first test signal has a first frequency, and the input signal includes a first spur having the first frequency. The second correlation signal corresponds to a second correlation between the input signal and a second test signal. The second test signal has a second frequency. The relative response signal corresponds to a relative response of the second frequency in the first correlation signal.

20 Claims, 9 Drawing Sheets

FIG. 11    1100
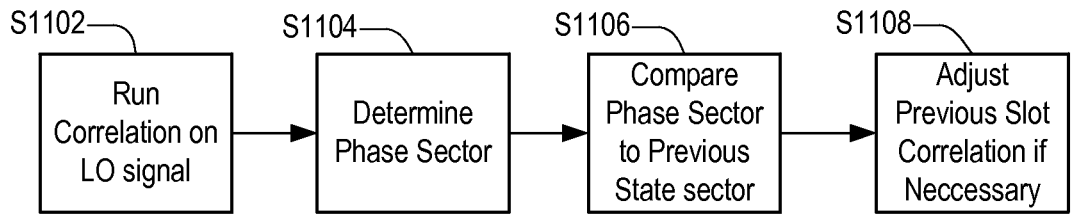
FIG. 12
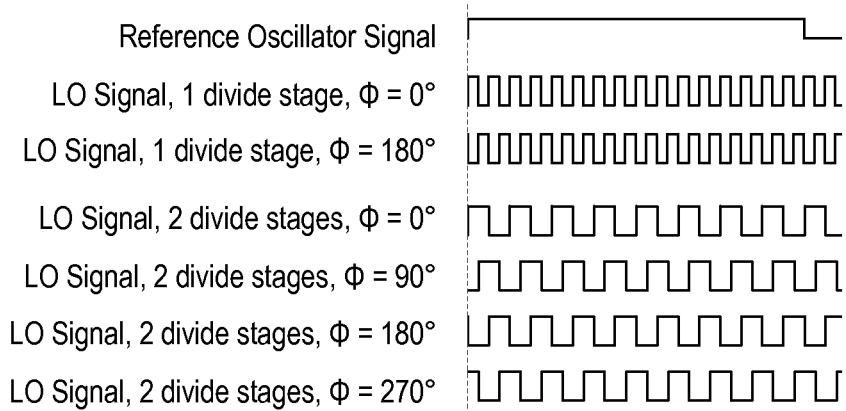
FIG. 13
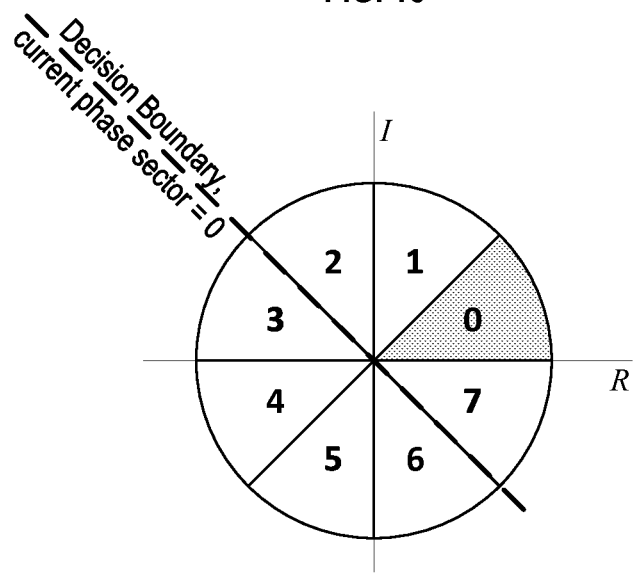

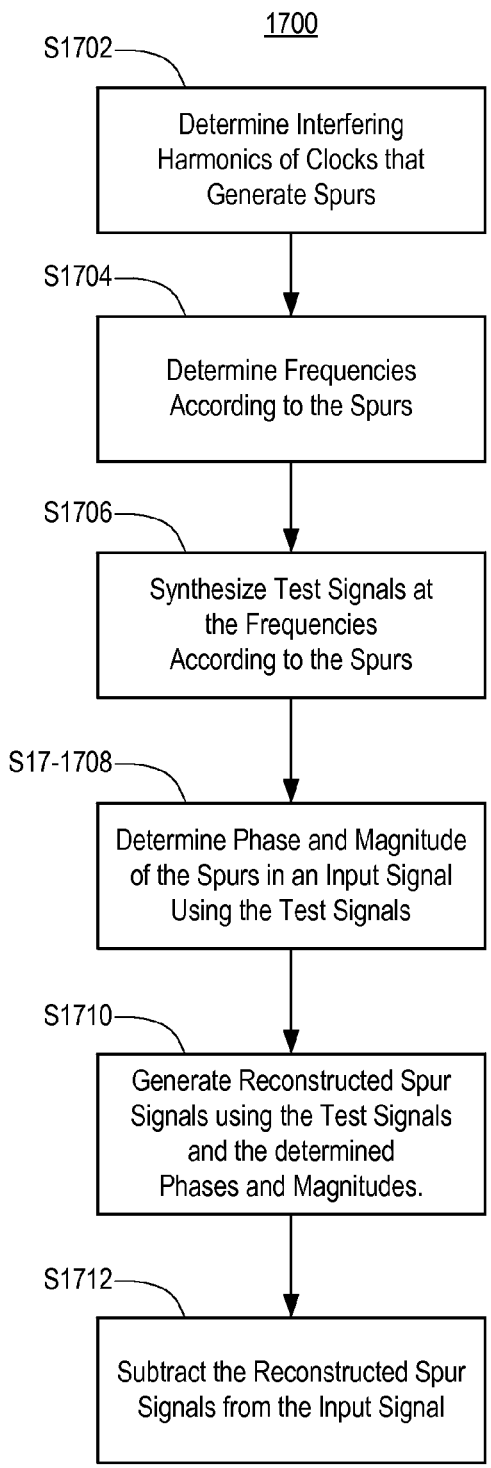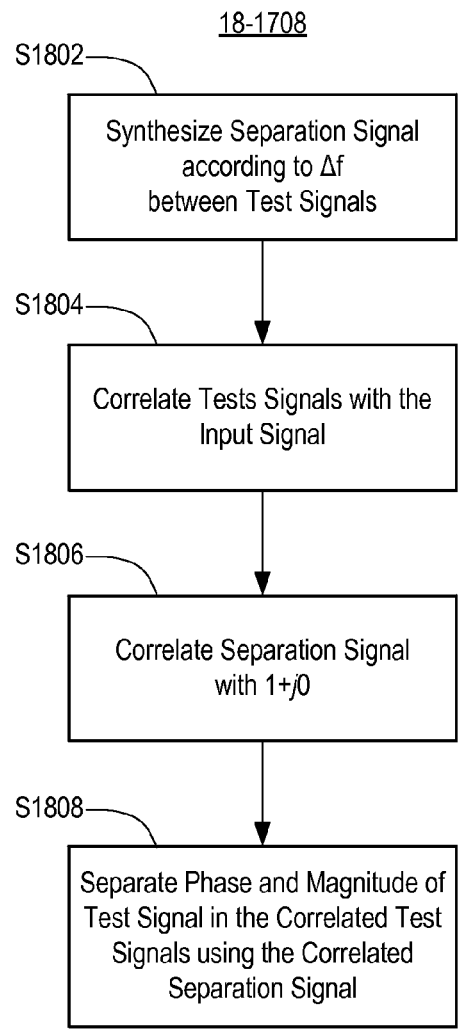

INTERFERENCE CANCELLATION

CROSS REFERENCE TO RELATED APPLICATIONS

The present disclosure claims the benefit of U.S. Provisional Applications No. 62/078,183, filed on Nov. 11, 2014, and No. 62/205,135, filed Aug. 14, 2015, which are each incorporated by reference herein in their entirety.

BACKGROUND

Wireless transceivers generate clocks, called Local Oscillators (LOs), used for down-conversion of received signals. The LOs are generated using a reference clock signal received from a Reference Oscillator circuit.

A frequency of the reference clock signal will from time to time vary from the desired frequency and therefore will need to be corrected. The frequency correction can be applied directly to the Reference Oscillator circuit or to a circuit that produces a replica of the reference clock signal. The amount of frequency correction needed may be determined using the received signals.

Any oscillator or clock circuit, whether uncorrected or corrected, will generate harmonic signals having respective frequencies that are integer multiples of the circuit's fundamental frequency. The harmonic signals may couple into sensitive receive circuits and interfere with the reception of the received signals.

A device may attempt to determine and cancel the interfering harmonic signals. In many wireless systems, such as cellular radio systems, the interference cancellation must be done very quickly, and as a result traditional feedback adaptive interference cancellation systems are not effective.

SUMMARY

In an embodiment, a circuit comprises a vector separator circuit to generate a first extracted signal according to (i) a first correlation signal, (ii) a second correlation signal, and (iii) a relative response signal.

The first correlation signal corresponds to a first correlation between an input signal and a first test signal. The first test signal has a first frequency, and the input signal includes a first spur having the first frequency.

The second correlation signal corresponds to a second correlation between the input signal and a second test signal. The second test signal has a second frequency. The relative response signal corresponds to a relative response of the second frequency in the first correlation signal.

The first extracted signal includes a phase of the first spur and a magnitude of the first spur.

In an embodiment, a method is performed by a receiver for cancelling interference. The method comprises generating a first correlation signal by correlating an input signal with a first test signal. The first test signal has a first frequency, and the input signal including a first spur having the first frequency.

The method further includes generating a second correlation signal by correlating the input signal with a second test signal. The second test signal has a second frequency.

The method further includes generating a relative response signal according to a difference between the first frequency and the second frequency, and generating a first extracted signal using (i) the first correlation signal, (ii) the second correlation signal, and (iii) the relative response signal. The first extracted signal includes a phase of the first spur and a magnitude of the first spur.

BRIEF DESCRIPTION OF THE DRAWINGS

FIG. 11 illustrates a process of adjusting for phase ambiguity caused by state ambiguity of divider circuits according to an embodiment.

FIG. 12 illustrates phase ambiguity caused by divider circuits according to an embodiment.

FIG. 13 illustrates the phase sectors during the process of FIG. 11 according to an embodiment.

FIG. 17 illustrates a process of interference cancellation according to an embodiment.

FIG. 18 illustrates a process of determining phases and magnitudes of interfering harmonics according to an embodiment.

DETAILED DESCRIPTION

Figure 1:
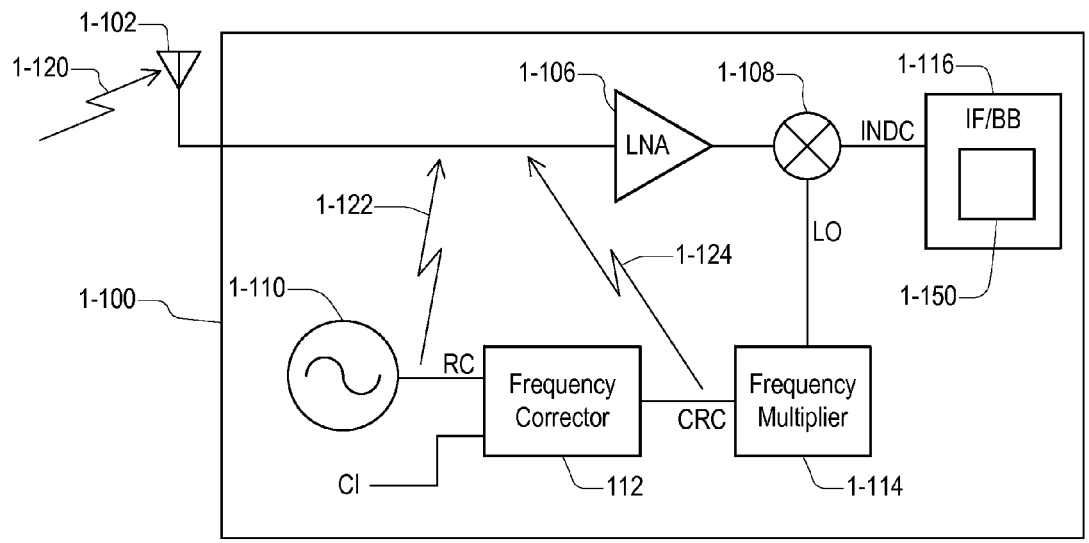
FIG. 1 illustrates an electronic device according to an embodiment.

FIG. 1 illustrates an electronic device 1-100 according to an embodiment. The device 1-100 includes, but is not limited to, a plurality of circuits including an antenna 1-102, a Low Noise Amplifier (LNA) 1-106, a down conversion mixer 1-108, a reference oscillator (RO) 1-110, a frequency corrector 112, a frequency multiplier 1-114, and an Intermediate Frequency (IF) or Baseband (BB) processor (hereinafter, baseband processor) 1-116. The device 1-100 may be a wireless transceiver, such as a cellular phone, a WiFi™ device, and the like.

The device 1-100 receives a received signal 1-120 using the antenna 1-102. The LNA 1-106 amplifies the received signal 1-120.

The mixer 1-108 produces a down-converted signal INDC by down-converting the amplified received signal 1-120 using a Local Oscillator (LO) signal. In an embodiment, the down-converted signal INDC is a baseband signal. In another embodiment, the down-converted signal INDC is an IF signal, wherein the IF signal occupies a frequency band having lower frequencies than the frequencies of the received signal 1-120.

The LO signal is generated using a Reference Clock (RC) signal generated by the RO 1-110. A desired frequency of the LO signal may be higher (for example, 40 to 50 times higher) than a frequency of the output of the RO 1-110. Accordingly, the LO signal is generated using the frequency multiplier 1-114. In an embodiment, the frequency multiplier 1-114 is a fractional frequency multiplier capable of producing an output signal having a frequency equal to a ratio M/N of a frequency of an input signal, where M and N are integers.

However, because of drift and inaccuracy in the RO 1-110, properties of the channel over which the received signal 1-120 was received (for example, Doppler shift), or both, the frequency of the output signal of the RO 1-110 may need to be corrected in order to produce a desired frequency of the LO signal.

In FIG. 1, the correction is performed using the frequency corrector 112. The frequency corrector 112 produces a corrected reference clock signal CRC according to the reference clock signal RC and correction information CI. In an embodiment, the frequency corrector 112 includes a fractional phase-locked loop or fractional delay locked loop, and generates the corrected reference clock signal CRC having a frequency equal to the frequency of the reference clock signal RC multiplied by a fraction or ratio indicated in the correction information CI.

A person of ordinary skill in the art in light of the teachings and disclosures herein would understand how to produce the correction information CI using the amplified received signal 1-120. A person of ordinary skill in the art in light of the teachings and disclosures herein would be aware of a variety of circuits suitable for implementing the frequency corrector 112.

The frequency multiplier 1-114 produces the local oscillator signal LO according to the corrected reference clock signal CRC and a ratio.

In an embodiment, the ratio is a fractional ratio M/N wherein N is an integer property of the frequency multiplier 1-114 and M is a value determined according to the desired frequency of the local oscillator signal LO and the frequency of the corrected reference clock signal CRC. For example, in an embodiment wherein N is 16, and given a desired frequency of the local oscillator signal LO of 879.661 MHz and a frequency of the corrected reference clock signal CRC of 19.44002 MHz, then M=N*879.661 MHz/19.44002 MHz=724, and the frequency multiplier 1-114 produces the local oscillator signal LO by multiplying the frequency of the corrected reference clock signal CRC by M/N=724/16=45.25.

A clock signal may generate signals at any harmonic of its fundamental frequency. Therefore the reference clock signal RC and the corrected reference clock signal CRC generate first and second harmonic signals 1-122 and 1-124, respectively.

The first and second harmonic signals 1-122 and 1-124 may couple into sensitive receive circuits, such as an input of the LNA 1-106, and interfere with reception of the received signal 1-120. The magnitude and phase of the interference generated by the first and second harmonic signals 1-122 and 1-124 may be impossible to determine in advance, and may vary according to manufacturing variations and fluctuations in operating conditions.

Although the phase of the interference generated by the spurs may be impossible to determine in advance, the phase of the down-converted spur is related to the phase of the first harmonic signal 1-122 and the phase of the local oscillator signal LO, as shown in Equations 1A to 1E, below:

$$f_{LO} = N \cdot f_{REF} + \Delta f \quad \text{Equation 1A}$$

$$M_{LO} = e^{-j \cdot (2\pi \cdot f_{LO} \cdot t + \phi_{LO})} \quad \text{Equation 1B}$$

$$M_{St} = A_1 \cdot e^{j(2\pi \cdot N \cdot f_{REF} \cdot t + \phi_{SPUR})} \quad \text{Equation 1C}$$

$$M_{DCS} = A_1 \cdot e^{j(2\pi \cdot \Delta f \cdot t + \phi_{LO} - \phi_{SPUR})} \quad \text{Equation 1D}$$

$$\phi_{DCS} = \phi_{LO} - \phi_{SPUR} \quad \text{Equation 1E}$$

wherein $f_{LO}$ is the frequency of the local oscillator signal LO, $f_{REF}$ is the frequency of the reference clock signal RC, N and $\Delta f$ are parameters of the frequency multiplier 1-114, $M_{LO}$ is a magnitude and $\phi_{LO}$ is a phase of the local oscillator signal LO according to a time t, $M_{St}$ is a magnitude and $\phi_{SPUR}$ is a phase of the spur interference received by the LNA 1-106 according to the time t, $M_{DCS}$ is a magnitude and $\phi_{DCS}$ is a phase of the down-converted spur interference in the down-converted signal INDC according to time t. As seen in Equation 1E, the phase of the down-converted spur interference in the down-converted signal INDC is equal to the phase of the local oscillator signal LO minus the phase of the spur interference received by the LNA 1-106.

Additional deterministic phase ambiguities may be introduced by divide by 2 circuits in the local oscillator path, such as, for example, divide by 2 circuits in the frequency multiplier 1-114.

Furthermore, the nature of some transmissions (for example, cellular transmissions) requires fast interference cancellation. As a result, traditional feedback adaptive interference cancellation systems may not be effective.

In an embodiment, an interference cancellation circuit 1-150 in the baseband processor 1-116 calculates frequencies of interference signals (called "spurs") caused by some of the harmonics of clock signals present in first and second harmonic signals 1-222 and 1-124, and determines magnitudes and phases of the spurs using a processed signal produced from the down-converted signal INDC. The interference cancellation circuit 1-150 further generates cancellations signals (that is, reconstructed spur signals) according to the calculated frequencies and the determined magnitudes and phases of the spurs, and subtracts the cancellations signals from the processed signal to reduce the magnitude of the spurs in the processed signal.

The processed signal may be produced by performing analog to digital conversion of the down-converted signal INDC. A person of ordinary skill in the art in light of the teachings and disclosures herein would be aware of other processing, such as equalization, clock recovery, and the like, that may be also be used to produce the processed signal from the down-converted signal INDC.

Figure 2:
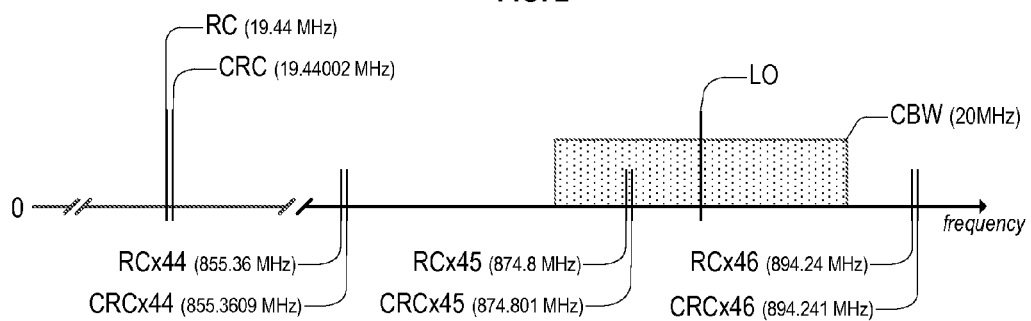
FIG. 2 illustrates interference generated by harmonics of clock signals of the electronic device of FIG. 1 according to an embodiment.

FIG. 2 illustrates interference generated by harmonics of clock signals in the device 1-110 of FIG. 1 according to an embodiment. The figure is not to scale.

In the illustrated embodiment, a reference clock signal RC has a frequency of 19.44 MHz, and a corrected reference clock signal CRC has a frequency of 19.44002 MHz. A local oscillator signal LO has a frequency equal to 45.25 times the frequency of the corrected reference clock signal CRC, 879.661 MHz. The frequency of the local oscillator signal LO may fall in the center of a 20 MHz wide channel bandwidth (CBW) of the received signal 1-120.

The $44^{th}$, $45^{th}$, and $46^{th}$ RC harmonics RCx44, RCx45, and RCx46 of the reference clock signal RC have frequencies of 855.36, 874.8, and 894.24 MHZ, respectively. The RC harmonics RCx44, RCx45, and RCx46 may be included in the first harmonic signal 1-122 of FIG. 1.

The $44^{th}$, $45^{th}$, and $46^{th}$ CRC harmonics CRCx44, CRCx45, and CRCx46 of the corrected reference clock signal CRC have frequencies of 855.3609, 874.801, and 894.241 MHZ, respectively. The CRC harmonics CRCx44, CRCx45, and CRCx46 may be included in the second harmonic signal 1-124 of FIG. 1.

The $45^{th}$ RC harmonic RCx45 and $45^{th}$ CRC harmonic CRCx45 fall within the 20 MHz CBW of the received signal 1-120, occurring at offsets of −4.8609 and −4.860 MHz from the frequency of the LO signal, respectively. As a result, the $45^{th}$ RC harmonic RCx45 and $45^{th}$ CRC harmonic CRCx45 that each fall within the 20 MHz CBW may introduce spurs into the received signal 1-120.

Figure 3:
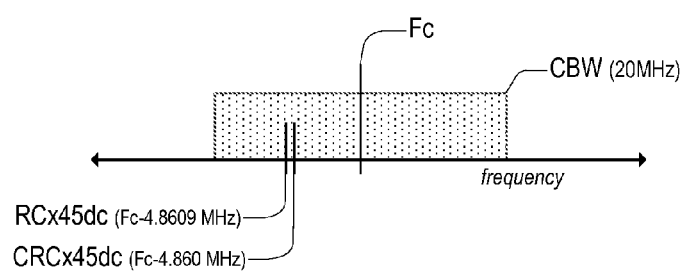
FIG. 3 illustrates interference generated by the harmonics of FIG. 2 after down-conversion according to an embodiment.

FIG. 3 illustrates interference generated by the harmonics after down-conversion according to an embodiment. The figure shows a 20 MHz CBW of the down-converted signal INDC having a center frequency Fc. First and second spurs RCx45dc and CRCx45dc (produced by the down-conversion of the $45^{th}$ RC harmonic RCx45 and the $45^{th}$ CRC harmonic CRCx45 shown in FIG. 2) occur at an offset of −4.8609 and −4.860 MHz, respectively, from the center frequency Fc.

Figure 4A:
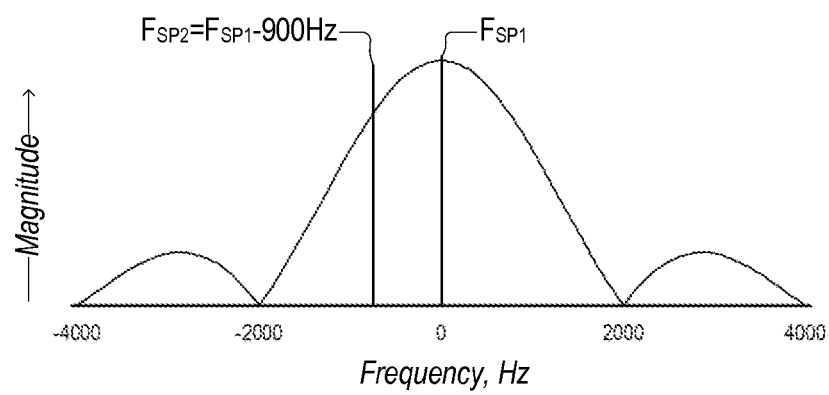
FIG. 4A illustrates a magnitude of an effect of spurs in a correlator according to an embodiment.

FIG. 4A illustrates an effect of the first spur RCx45dc and second spur CRCx45dc in a first correlator according to an embodiment. A curved line plotted in the figure shows a frequency response of the first correlator configured to extract information, such as phase and magnitude information, about a first spur SP1 (corresponding to the down-converted $45^{th}$ CRC harmonic CRCx45dc of the corrected reference clock signal CRC shown in FIG. 3) from a signal.

The frequency response of the first correlator is proportional to an absolute value of sin(x)/x, x=2·π·(f-$F_{SP1}$)/$b_{CORR}$, wherein f is a frequency, $F_{SP1}$ is a first frequency that corresponds to a frequency of the first spur SP1, and $b_{CORR}$ is a bin width of the first correlator. The frequency response of the first correlator has a peak value at the first frequency $F_{SP1}$, and has a 4 KHz bin width $b_{CORR}$ (extending 2 KHz to either side of the first frequency $F_{SP1}$). The bin corresponds to frequencies of signals that will affect the output produced by the first correlator, and may be determined by a correlation time, which in a wireless system may be short.

For example, a correlation time may be 0.5 milliseconds in a cellular system, producing a 4 KHz wide bin. Longer correlation times result in a proportionally narrower bin. For example, a 1.0 millisecond correlation time produces a 2 KHz wide bin.

A second frequency $F_{SP2}$ corresponds to a frequency of the second spur SP2 (corresponding to the down-converted $45^{th}$ RC harmonic RCx45dc of the reference clock signal RC shown in FIG. 3). As shown, the second frequency $F_{SP2}$ is 900 Hz less than the first frequency $F_{SP1}$, and therefore falls within the bin of the first correlator. As a result, the second spur SP2 will affect the output of the first correlator.

Figure 4B:
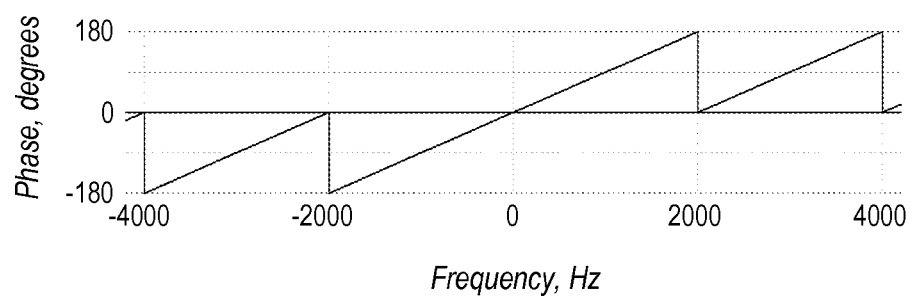
FIG. 4B illustrates a phase of an effect of spurs in the correlator according to an embodiment.

FIG. 4B illustrates a phase response of the first correlator of FIG. 4A having the 4 KHz bin width.

Embodiments described herein separate the information about the first spur SP1 from the effects of the second spur SP2 by determining a relative response of the second spur SP2 in the first correlator. Due to the symmetric magnitude response and asymmetric phase response of correlators, the determined relative response may also be used to separate extracted information about the second spur SP2 from effects of the first spur SP1 in a second correlator configured to extract information about the second spur SP2.

Figure 5:
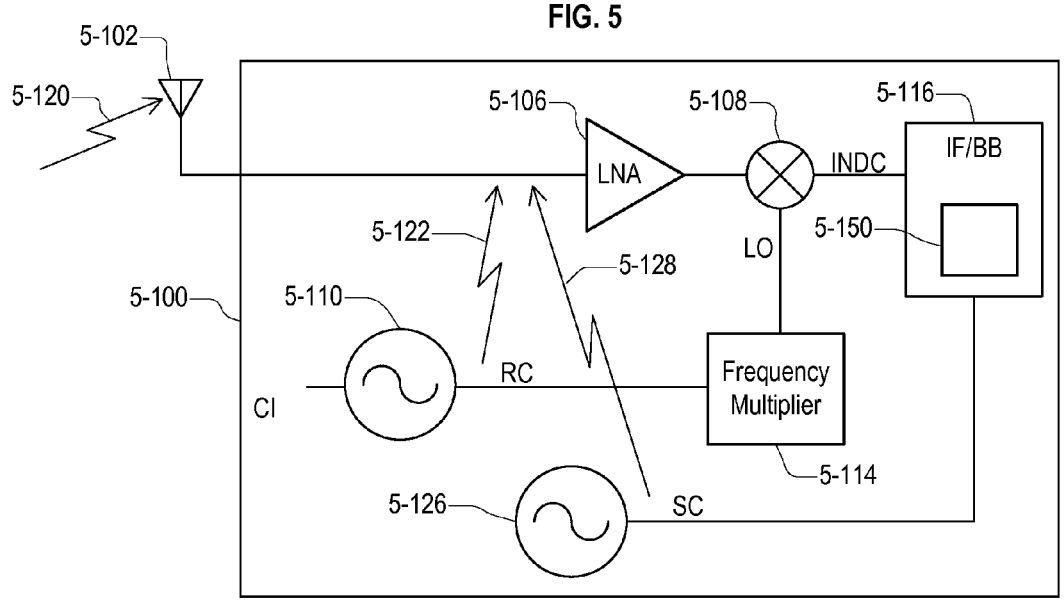
FIG. 5 is a block diagram of an electronic device according to another embodiment.

FIG. 5 is a block diagram of an electronic device 5-100 according to another embodiment. Like numbered reference numbers in FIG. 5 refer to similar components in FIG. 1, and descriptions thereof are omitted in the interest of brevity.

FIG. 5 differs from FIG. 1 in that in FIG. 5, the correction information is applied directly to the RO 5-110 and corrects the frequency of a reference clock signal RC. As a result there is no signal in FIG. 5 corresponding to the corrected reference clock signal CRC of FIG. 1.

FIG. 5 also differs from FIG. 1 in that the electronic device 5-100 includes a system oscillator 5-126 configured to provide a system clock signal SC to a baseband processor 5-116. The system clock signal SC generates a system clock harmonic signal 5-128. The system clock harmonic signal 5-128 may couple into sensitive receive circuits, such as an input of the LNA 5-106, and interfere with reception of the received signal 5-120.

Figure 6:
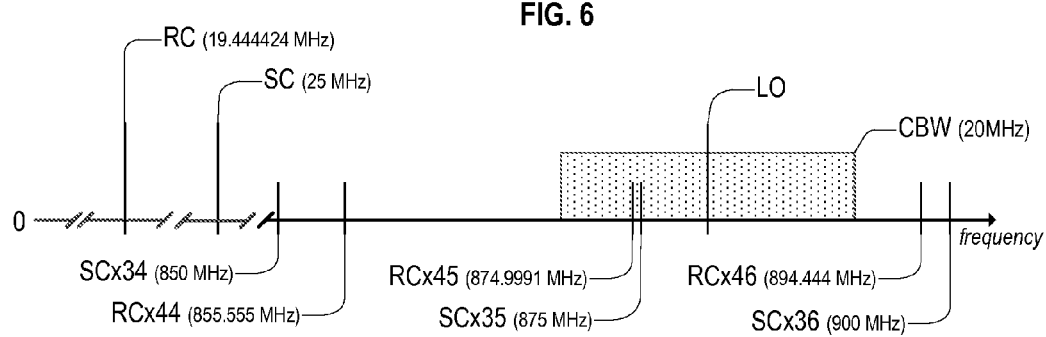
FIG. 6 illustrates interference generated by harmonics of clock signals of the electronic device of FIG. 5 according to an embodiment.

FIG. 6 illustrates interference generated by clock harmonic signals 5-122 and 5-128 of FIG. 5 according to an embodiment. In the embodiment of FIG. 6, a $45^{th}$ RC harmonic RCx45 of the (corrected) 19.444424 MHz reference clock signal RC and a $35^{th}$ SC harmonic SCx35 of a 25 MHz system clock signal SC each fall within a 20 MHz channel bandwidth CBW.

A frequency of the $45^{th}$ RC harmonic RCx45 and a frequency of the $35^{th}$ SC harmonic SCx35 differ by less than a bin width of a correlator such as that shown in FIG. 4. Accordingly, embodiments referred to herein may separate extracted information about a spur produced by the $45^{th}$ RC harmonic RCx45 from the effects of a spur produced by the $35^{th}$ SC harmonic SCx35 by determining a relative response of the second spur SP2 in the correlator.

Figure 7:
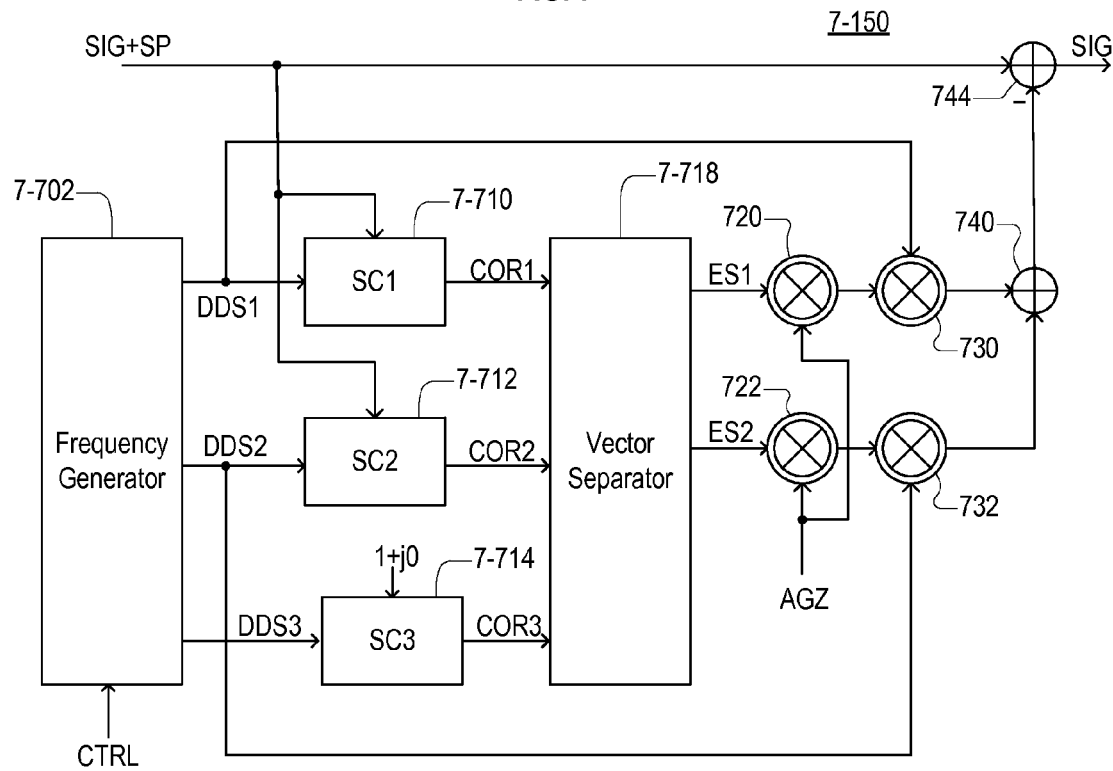
FIG. 7 illustrates an interference cancellation circuit according to an embodiment.

FIG. 7 illustrates an interference cancellation circuit 7-150 according to an embodiment. The interference cancellation circuit 7-150 is suitable for use in the baseband processors 1-116 and 5-116 of FIGS. 1 and 5, respectively. The interference cancellation circuit 7-150 receives an input signal SIG+SP that includes a wanted signal and one or more spurs, and performs cancellation of the spurs to produce an output signal SIG.

The input signal SIG+SP may be a signal produced using analog to digital conversion of the down-converted signal INDC of FIGS. 1 and 5 and subsequent digital signal processing of the resulting signal. In an embodiment, Sample Rate Conversion (SRC) and digital gain control are performed using the output signal SIG produced by the interference cancellation circuit 7-150.

The input signal SIG+IP may comprise a sequence of constellation points occurring at a sample rate. Each constellation point may include a complex number corresponding to a magnitude and a phase of the received signal at a point in time. The constellation points may be organized into slots, each slot including a plurality of consecutive constellation points. Each slot corresponds to a period of time allocated to a transmission of a signal.

The interference cancellation circuit 7-150 includes a frequency generator 7-702, first, second, and third smart correlators 7-710, 7-712, and 7-714, a vector separator 7-718, first, second, third, and fourth complex multipliers 720, 722, 730, and 732, and first and second summing nodes 740 and 744.

The frequency generator 7-702 generates first, second, and third test signals DDS1, DDS2, and DDS3. Each of the test signals DDS1, DDS2, and DDS3 may include a sequence of complex numbers generated at the sample rate of the input signal SIG+SP. Each complex number corresponds to a phase and magnitude of the respective test signal.

The first and second test signals DDS1 and DDS2 have first and second frequencies equal to frequencies of first and second spurs in the input signal SIG+SP, respectively, wherein the first and second spurs are produced by harmonics of respective first and second clock signals.

The frequency of each of the test signals DDS1 and DDS2 may be determined using Equation 2, below:

$$F_{TS}=N \cdot F_{CX}-F_{LO} \qquad \text{Equation 2}$$

wherein $F_{TS}$ is the frequency of the respective test signal, N is a respective harmonic number, $F_{CK}$ is a frequency of the respective clock signal, and $F_{LO}$ is a frequency of a local oscillator signal used to down-convert a received signal into the down-converted signal INDC.

The respective harmonic number N may be determined using Equation 3, below, $$N=\lfloor (F_{RF}-0.5 \cdot CBW)/F_{CK} \rfloor \qquad \text{Equation 3}$$

wherein $F_{RF}$ is a center frequency of the received signal, CBW is a channel bandwidth of the received signal, and $\lfloor x \rfloor$ is a floor function returning a largest integer less than or equal to x.

Because harmonics of a clock signal are spaced apart by the frequency of the clock signal, in an embodiment wherein the frequency FCK of the clock signal is less than the channel bandwidth CBW of the received signal, additional spurs may exist due to clock signal harmonics corresponding to each N+k less than $(F_{RF}+0.5 \text{ CBW})/F_{CK}$, where k is an integer greater than or equal to 1. In such an embodiment, additional interference cancellation circuits 7-150 may be employed to cancel the additional spurs.

The third test signal DDS3 has a frequency equal to a difference between the first frequency of the first test signal DDS1 and the second frequency of the second test signal DDS2.

The first and second smart correlators 7-710 and 7-712 are configured to produce respective first and second correlation signals COR1 and COR2 by correlating the first and second test signals DDS1 and DDS2, respectively, with the input signal SIG+SP. The first and second smart correlators 7-710 and 7-712 receive the constellation points of the input signal SIG+SP and the complex numbers of the first and second test signals DDS1 and DDS2, respectively, at the sample rate of the input signal SIG+SP.

The values of the first and second correlation signals COR1 and COR2 include phase and magnitude information for the first and second spurs, respectively. The values of each of the correlation signals COR1 and COR2 may also include other information due to the presence of the other spur within their respective correlation bins.

The third smart correlator 7-714 is configured produce a third correlation signals COR3 by correlating the third test signal DDS3 with a constant complex value 1+j0, where j= $\sqrt{-1}$. Because the third test signal DDS3 has a frequency equal to the difference of the frequencies of the first and second test signals DDS1 and DDS2, the third correlation signal COR3 is a relative response signal corresponding to a "sin(x)/x" relative phase and magnitude response of the second spur in the first smart correlator 7-710, and by symmetry to a relative phase and magnitude response of the first spur in the second smart correlator 7-712.

In an embodiment, the smart correlators 7-710, 7-712, and 7-714 process their respective input value at a rate equal to the sample rate of the input signal SIG+SP, and produce values of the correlation signals COR1, COR2, and COR3, respectively, at a rate equal to the slot rate of the input signal SIG+SP.

In an embodiment including Time Division Duplexing (TDD), the smart correlators 7-710, 7-712, and 7-714 only process inputs during a slot of the input signal SIG+SP. In an embodiment, the smart correlators 7-710, 7-712, and 7-714 produce each of the values of the correlation signals COR1, COR2, and COR3, respectively, using input values from a plurality of separated slots.

In a TDD situation, the smart correlators 7-710, 7-712, and 7-714 can be paused in between slots and capture multiple slots correctly. In a multi-slot scenario, the effective correlator frequency response of the smart correlators 7-710, 7-712, and 7-714 is no longer sin(x)/x, but instead can be a much more complicated response. Nevertheless, the operation by which the third correlation signal COR3 is generated results in a correct determination of the second spur response in the first smart correlator 7-710 (and by symmetry of the first spur response in the second smart correlator 7-712).

The vector separator 7-718 produces first and second extracted signals ES1 and ES2 using the correlation signals COR1, COR2, and COR3. The first and second extracted signals ES1 and ES2 include phase and magnitude information of the first and second spurs SP1 and SP2, respectively.

The vector separator 7-718 uses the second and third correlation signals COR2 and COR3 to determine a phase and magnitude of a contribution of the second spur SP2 to the first correlation signal COR1 and removes that contribution from the first correlation signal COR1 to produce the first extracted signal ES1. The vector separator 7-718 uses the first and third correlation signals COR1 and COR3 to determine a phase and magnitude of a contribution of the first spur SP1 to the second correlation signal COR2 and removes that contribution from the second correlation signal COR2 to produce the second extracted signal ES2. Details of the operation of the vector separator 7-718 are described below with reference to FIGS. 11A and 11B.

In an embodiment, the vector separator 7-718 processes input values and produce values of the extracted signals ES1 and ES2 at a rate equal to the slot rate of the input signal SIG+SP. Values of the extracted signals ES1 and ES2 occur one slot delay after the corresponding inputs to the vector separator 7-718.

In an embodiment, first and second complex multipliers 720 and 722 are respectively configured to scale the first and second extracted signals ES1 and ES2 according to an analog gain zone signal AGZ. In an embodiment, the first and second complex multipliers 720 and 722 respectively scale the first and second extracted signals ES1 and ES2 for one slot after a change in an analog gain, such as a change in a gain of the LNA 1-106 of FIG. 1.

When the change in the analog gain occurs, a phase and magnitude of the spurs may change. Therefore, to improve the accuracy of the correlation signals COR1, COR2, and COR3 the smart correlators 7-710, 7-712, and 7-714 are restarted when the change in the analog gain occurs.

Scaling the extracted signals ES1 and ES2 allows the phase and magnitude information for the spurs, which was generated when the analog gain was the previous value, to be used to generate an estimate of the new phase and magnitude of the spurs for an initial period after the change in the analog gain. For example, when a new analog gain is a ratio R of an old analog gain, the current extracted signals ES1 and ES2 may be scaled by the ratio R to estimate the relative effect of the new analog gain on the spurs.

One slot time after the analog gain change, at which time the extracted signals ES1 and ES2 will reflect the effects of the analog gain change, the scaling may be removed (that is, set to 1).

In another embodiment, the first and second complex multipliers 720 and 722 are respectively bypassed or not present, so that the third and fourth complex multipliers 730 and 732 receive the first and second extracted signals ES1 and ES2, respectively, without any scaling.

The third complex multiplier 730 produces a reconstruction of the first spur by complex-multiplying the first test signal DDS1 by the phase and magnitude information of the first extracted signal ES1. The fourth complex multiplier 732 produces a reconstruction of the second spur by complex-multiplying the second test signal DDS2 by the phase and magnitude information of the second extracted signal ES2. The complex multipliers 730 and 740 produce their respective output values at the sample rate of the input signal SIG+SP.

The first summing node 740 sums the reconstructions of the first and second spurs to produce a reconstructed interference signal. The second summing node 744 subtracts the reconstructed interference signal from the input signal SIG+SP to produce the output signal SIG in which the interference caused by the first and second spurs is cancelled.

Figure 8:
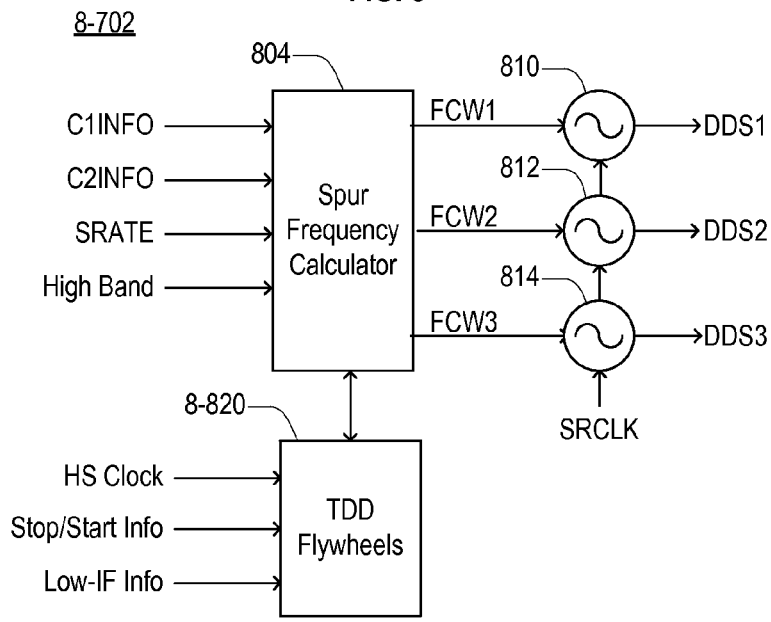
FIG. 8 illustrates a frequency generator circuit suitable for use in the interference cancellation circuit of FIG. 7 according to an embodiment.

FIG. 8 illustrates a frequency generator circuit 8-702 suitable for use in the interference cancellation circuit 7-150 of FIG. 7 according to an embodiment. The frequency generator circuit 8-702 includes a spur frequency calculator 804, first, second, and third frequency synthesizers 810, 812, and 814, and a Time Division Duplex (TDD) Flywheels circuit 8-820.

The spur frequency calculator 804 is configured to produce a first, second and third frequency control words FCW1, FCW2, and FCW3 according to first and second clock information C1INFO and C2INFO, sample rate SRATE, and information on the frequency and channel bandwidth of a radio frequency received signal (High Band).

In an embodiment, the first and second clock information C1INFO and C2INFO include information of the first and second clock signals that may generate harmonics, which may include a frequency of the respective clock signal or information sufficient for determining the frequency of the respective clock signal. For example, the clock information C1INFO and C2INFO may include one or more of PLL or DLL divider parameters, a reference clock frequency, and the like.

In an embodiment, the spur frequency calculator 804 may determine a multiplier (i.e. harmonic number N in Equation 3) of a harmonic of the first clock signal that may generate a spur using the information of the frequency of the first clock signal and the High Band information by performing the calculations of Equation 3, above. The spur frequency calculator 804 may determine a multiplier of a harmonic of the second clock signal that may generate a spur using the information of the frequency of the second clock signal and the High Band information by performing the calculations of Equation 3, above.

In an embodiment, the multiplier of a harmonic that may generate a spur may be determined from the PLL or DLL divider parameters. When an LO signal is generated from the first clock signal using a fractional PLL, the multiplier of a harmonic that may generate a spur may be determined from the integer portion of the fractional PLL frequency multiplication ratio. For example, in FIG. 2, where the LO signal is generated by multiplying a frequency of the corrected reference clock CRC by 45.25, a multiplier of a harmonic that may generate a spur is 45.

Using the determined multipliers, the spur frequency calculator 804 may determine frequencies of the first and second spurs generated by the harmonics of the first and second clocks, respectively, using Equation 2, above. The spur frequency calculator 804 may determine values of the first and second frequency control words FCW1 and FCW2 for the first and second spurs, respectively, using Equation 4:

$$FCW_n = K_{2\pi} * F_{SPn}/\text{SRate} \qquad \text{Equation 4}$$

wherein $FCW_n$ is the value of the respective frequency control word, $K_{2\pi}$ is a constant corresponding to a phase change of $2\cdot\pi$ radians in the first and second synthesizers 810 and 812, $F_{SPn}$ is a frequency of the respective spur, and SRate is a frequency corresponding to the sampling rate of the input signal SIG+SP.

The spur frequency calculator 804 may determine a value of a third frequency control word FCW3 using Equation 5:

$$FCW3 = K_{2\pi} * |F_{SP1} - F_{SP2}|/\text{SRate} \qquad \text{Equation 5}$$

wherein $F_{SP1}$ and $F_{SP2}$ are frequencies of the first and second spur, respectively.

In an embodiment, the operations of the spur frequency calculator 804 are performed by a processor executing computer programming instructions stored in a non-transitory computer readable media. The processor may be one or more of a general-purpose processor, a digital signal processor, a special-purpose processor, and the like.

The first, second, and third frequency synthesizers 810, 812, and 814 generate the first, second, and third test signals DDS1, DDS2, and DDS3 using the first, second, and third frequency control words FCW1, FCW2, and FCW3, respectively. The first, second, and third test signals DDS1, DDS2, and DDS3 have values corresponding to a sine wave having a frequency of the first spur, a frequency of the second spur, and a difference between the frequencies of the first and second spurs, respectively.

The frequency synthesizers 810, 812, and 814 operate according to a sample rate clock SRCLK having a frequency corresponding to the sampling rate of the input signal SIG+SP. A person of ordinary skill in the art in light of the teachings and disclosures herein would be aware of a variety of circuits for implementing the frequency synthesizers 810, 812, and 814.

In one embodiment, each of the frequency synthesizers 810, 812, and 814 comprises an accumulator having a value ACC and a lookup table. The lookup table incorporates values corresponding to real and imaginary components occurring during one cycle of a sine wave. For example, an embodiment of the lookup table may include a plurality of complex values corresponding to $\sin(n)+j\cdot\sin(n+\pi/2)$, $n=0$, $2\cdot\pi/N$, $4\cdot\pi/N$, ..., $2\cdot(N-1)\cdot\pi/N$, where N corresponds to a count of the plurality of complex values.

When operating, the accumulator of the first frequency synthesizers 810 adds, once for each cycle of the sample rate clock SRCLK, the first frequency control word FCW1 to its accumulated value ACC modulo the constant $K_{2\pi}$ corresponding to a phase change of 2·π radians:

$$ACC=(ACC+FCW_n) \bmod K_{2\pi} \qquad \text{Equation 6.}$$

The lookup table of the first frequency synthesizers 810 produces, once for each cycle of the sample rate clock SRCLK, a value of the first test signal DDS1 according to the value ACC of the accumulator. The value of the first test signal DDS1 includes a real and an imaginary component.

The second and third frequency synthesizers 812 and 814 operate similarly, using the second and third frequency control words FCW2 and FCW3 to produce values of the second and third test signals DDS2 and DDS3.

The accumulators of the frequency synthesizers 810, 812, and 814 continue to operate between slots, which allows the correlators to accumulate values from a plurality of separated slots.

The TDD Flywheels circuit 8-820 is configured to provide precise start and stop timing to the frequency synthesizers 810, 812, and 814 in order to generate a proper phase adjustment in embodiments using TDD. In embodiments of systems using TDD with low-IF processing, the TDD Flywheels circuit 8-820 provides precise phase adjustment of the frequency synthesizers 810, 812, and 814 to compensate for the phase change due to missing low-IF down-conversion processing.

Figure 9:
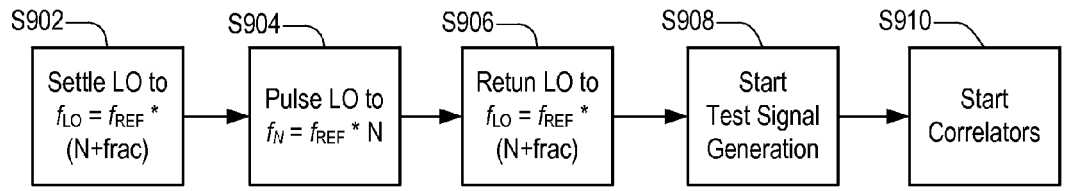
FIG. 9 illustrates a process of producing a constant down-converted spur phase after local oscillator startup according to an embodiment.
Figure 10:
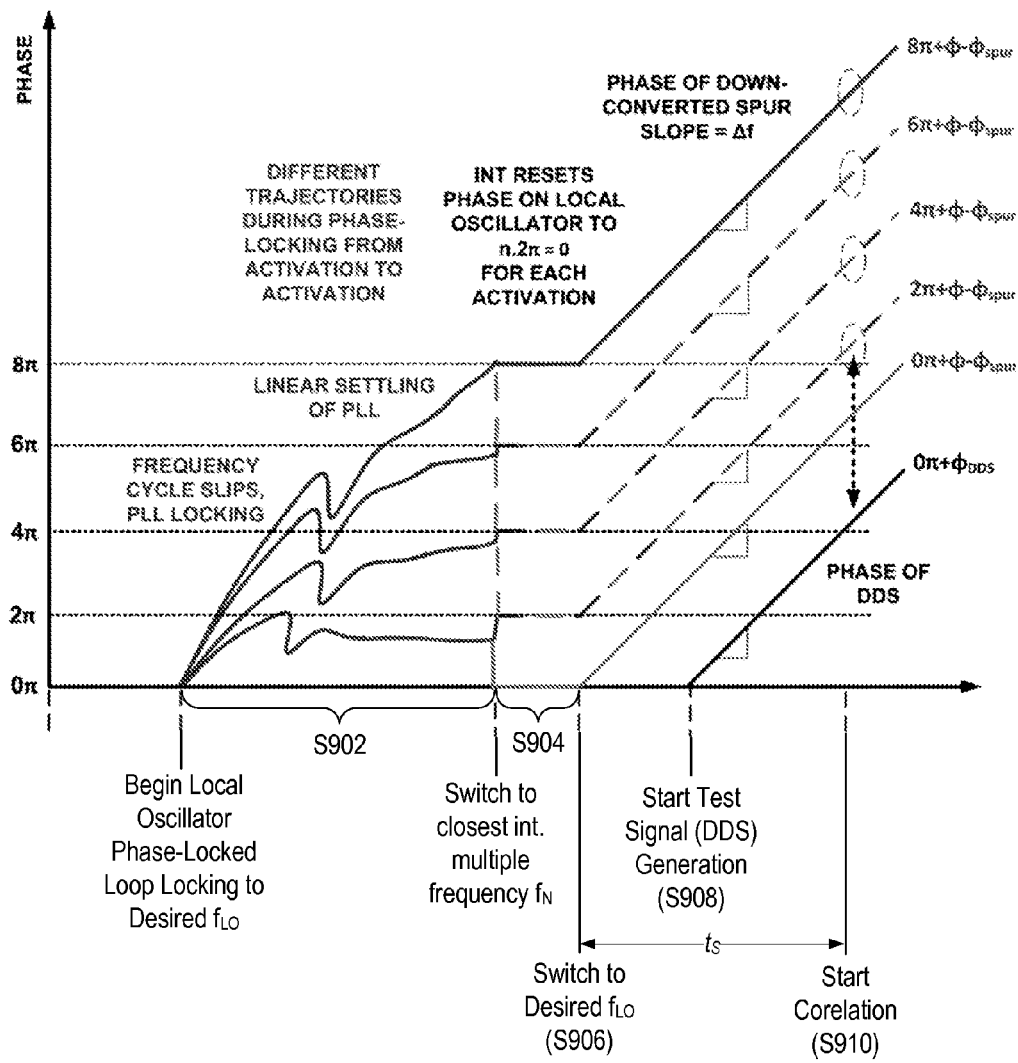
FIG. 10 illustrates the phase of the down-converted spur during the process of FIG. 9 according to an embodiment.

FIG. 9 illustrates a process 900 of producing a constant down-converted spur phase after local oscillator startup according to an embodiment. FIG. 10 illustrates the phase of the down-converted spur during the process 900 of FIG. 9.

The process 900 may be performed using one or more of application-specific control logic and computer programming instructions executed by a processor or controller of, for example, the electronic device 1-100 of FIG. 1 or the electronic device 5-100 of FIG. 5.

The process 900 may be performed after a local oscillator signal LO is activated, such as after power is provided or restored to a receiver that uses the local oscillator signal LO. In an embodiment, the local oscillator signal is generated using a fractional-N multiply of a reference oscillator signal.

At S902, the local oscillator signal LO is settled to its intended frequency $f_{LO}$ equal to the fractional-N multiply (N+frac) of the reference frequency $f_{REF}$ of the reference oscillator signal. A time to settle the local oscillator signal LO may include a duration of one or more calibration steps and a settling time of a frequency multiplier circuit. The time to settle the local oscillator signal LO and the phase of the local oscillator signal LO when settled may vary from activation to activation.

After the local oscillator signal LO has settled, at S904 the frequency multiplier circuit is controlled to generate the local oscillator signal LO at an integer multiple frequency $f_N$ equal to a nearest integer multiple of the reference frequency $f_{REF}$. The nearest integer is an integer above or below the effective multiplier of the reference frequency $f_{REF}$, that generates the desired intended frequency $f_{LO}$, that is, the nearest integer to the effective value of N+frac.

In an embodiment, a difference between the intended frequency $f_{LO}$ and the integer multiple frequency $f_N$ equal to the nearest integer multiple is small enough that no cycle slips occur in the local oscillator signal LO when the frequency multiplier circuit is operating in a linear settling mode.

As a result, the phase of the local oscillator signal LO relative to the reference oscillator signal becomes equal to a multiple of 2π; that is, a start of cycle of the reference oscillator signal always coincides with a start of a cycle of the local oscillator signal LO.

At S906, the local oscillator signal LO is restored to the intended frequency $f_{LO}$ at the intended fractional-N (N+frac) multiple of the reference frequency $f_{REF}$. At this time, the phase of the local oscillator signal LO relative to the reference oscillator signal becomes a linear function of time having a slope equal to the difference in frequency between the intended frequency $f_{LO}$ and the integer multiple frequency $f_N$.

At S908, generation of test signals against which the down-converted input signal is correlated is activated. In an embodiment, the timing of the activation of test signal generation relative to the restoration of the local oscillator signal LO to the intended frequency $f_{LO}$ at S906 is substantially consistent from one slot to the next.

At S910, correlators in a spur cancellation engine, such as the correlators 7-710, 7-712, and 7-714 of FIG. 7, are started at a precise predetermined delay time $t_S$ after the operations of S906 have been performed. In an embodiment, the predetermined delay time $t_S$ is equal to a duration of an integer number of cycles of the reference oscillator signal.

As a result, the relative phase between the reference oscillator signal and the local oscillator signal upon each activation of the correlators is a constant. Because the phase of the down-converted spur is determined according to the phase of the reference oscillator signal, the relative phase between the down-converted spur and the local oscillator signal upon each activation of the correlators is also a constant. As a result, the previous slot correlation that occurred before the re-activation of the correlators may be used for spur cancellation during the current slot.

FIG. 11 illustrates a process 1100 of adjusting for divider state ambiguities in divide-by-two stages of the circuit generating the local oscillator signal LO according to an embodiment. The divider state ambiguities (for example, ambiguity in whether flip-flops in the divider have a 0 or 1 value at the start of a cycle of the reference clock) may introduce phase ambiguities into the local oscillator signal LO.

The process 1100 may be performed using one or more of application-specific control logic and computer programming instructions executed by a processor or controller of, for example, the electronic device 1-100 of FIG. 1 or the electronic device 5-100 of FIG. 5.

The phase ambiguities may have magnitudes that are a multiple of π when one divide-by-two stage is present in the circuit, or multiples of π/2 radians when two divide-by-two stages are present in the circuit. Examples of the possible phases φ for the local oscillator (LO) signal relative to the reference oscillator signal when the local oscillator signal is generated using one or two divide-by-two stages are shown in FIG. 12.

In an embodiment, configured to receive signals from two bands, one divide-by-two stage may be used when a high band signal is being received, and two divide-by-two stages may be used when a low band signal is being received.

By determining the phase ambiguity in each slot, the correlation may be adapted to a change in the divider state between two slots, and may therefore be able to use a previous slot correlation that occurred before the re-activation of the correlators for spur cancellation during the current slot.

At S1102, a short correlation is run on the local oscillator signal LO output during a pre-slot time. The correlation output includes a real and an imaginary component. In an embodiment, the correlation output is filtered to reduce noise.

At S1104, a phase sector is determined using the correlation output. In one embodiment, the phase sector may be determined using Table 1, below, wherein SignRe and SignIm are the signs of the real and imaginary components of the correlation output, respectively, Re>Im is true when the magnitude of the real component is greater than the magnitude of the imaginary component and false otherwise, and sector is the phase sector number. Each sector corresponds to 45 degrees ($\pi/4$ radians):

TABLE 1

| SignRe | SignIm | Re > Im | Sector |
|--------|--------|---------|--------|
| +      | +      | True    | 0      |
| +      | +      | False   | 1      |
| −      | +      | False   | 2      |
| −      | +      | True    | 3      |
| −      | −      | True    | 4      |
| −      | −      | False   | 5      |
| +      | −      | False   | 6      |
| +      | −      | True    | 7      |

The phase sectors are shown in FIG. 13.

At S1106, the phase sector determined for the current slot is compared to a phase sector determined for a previous slot. In an embodiment, the comparison includes subtracting, modulo 8, the phase sector of the previous slot from the phase sector of the current slot.

At S1108, a previous slot correlation is adjusted when a phase difference between the previous slot and the current slot is detected using the comparison performed as part of S1106.

In an embodiment having a single divide-by-two stage, when the result of the modulo-8 subtraction is 3, 4, 5, or 6 (corresponding to a phase difference of greater than 90 degrees ($\pi/2$ radians) and less than 315 degrees ($7\cdot\pi/4$ radians), and as represented by the Decision Boundary shown in FIG. 13), the process determines that the state ambiguity of the divide-by-two stage introduced a phase difference between the previous slot and the current slot. Because the state ambiguity of a single divide-by-two stage can only introduce a 180 degree phase difference, the process determines that no phase difference has been introduced when the result of the module-9 subtraction is 1, 2, or 7.

In another embodiment having a single divide-by-two stage, when the result of the modulo-8 subtraction is 2, 3, 4, or 5, (corresponding to a phase difference of greater than 45 degrees ($\pi/5$ radians) and less than 270 degrees ($3\cdot\pi/2$ radians)) the process determines that the state ambiguity of the divide-by-two stage introduced a phase difference.

In an embodiment having two divide-by-two stages, when the result of the modulo-8 subtraction is 2, 3, 4, 5, 6, or 7, the process determines that the state ambiguity of the divide-by-two stage introduced a phase difference between the previous slot and the current slot. In an embodiment having two divide-by-two stages, when the result of the modulo-8 subtraction is 1, 2, 3, 4, 5, or 6, the process determines that the state ambiguity of the divide-by-two stage introduced a phase difference between the previous slot and the current slot.

When the process determines that a phase difference has been introduced by state ambiguity of the divide-by-two stage(s), the previous slot correlation must be adjusted accordingly before being used for spur cancellation during the current slot. The previous slot correlation is adjusted by altering a phase of the test signals (such as test signals DDS1, DDS2, and DDS3 of FIG. 7) by the determined phase difference using phase adjust inputs of the circuit that generate the test signals (such as frequency generator 7-702 of FIG. 7).

Figure 14:
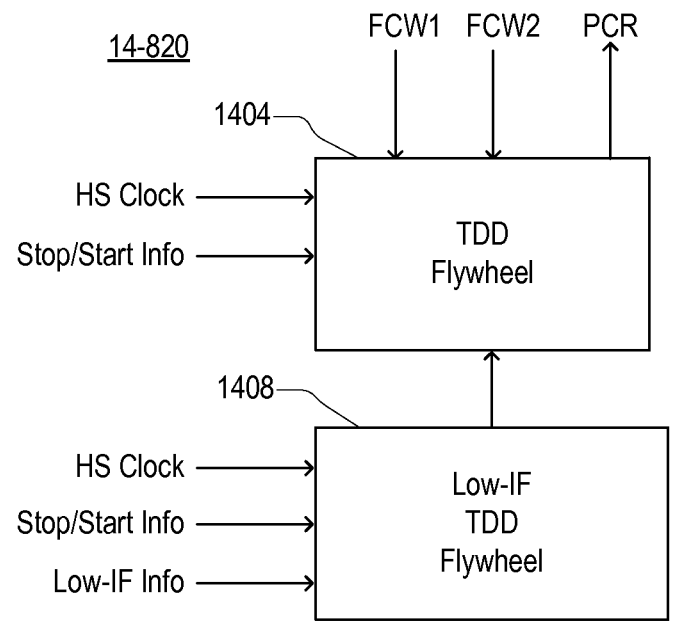
FIG. 14 illustrates a Time Division Duplexing (TDD) Flywheels circuit suitable for use in the frequency generator circuit of FIG. 8 according to an embodiment.

FIG. 14 illustrates a TDD flywheels circuit 14-820 suitable for use in the TDD flywheels circuit 8-820 of FIG. 8 according to an embodiment. The TDD flywheels circuit 14-820 includes a TDD Flywheel 1404 and a Low-IF TDD flywheel 1408.

In embodiments using TDD, devices receive data during a subset of the available slots and do not receive data during the remaining slots. During periods when data is not being received (hereinafter, referred to as no-data periods), a receive system may be shut down.

When the device re-starts the receive system after a no-data period, the phase of the sampling clock of the input signal SIG+SP may change. Furthermore, during the no-data periods, the phase of the clocks generating the spurs will have progressed, and as a result the phase of the spurs will also have progressed. The uncertainty on the sampling clock can be as high as a sample delay affecting cancellation. The effect of this phase error between the sampling clock and the spurs will be higher for higher spur frequencies and the cancellation will be lower. The TDD flywheel 1404 and TDD Low-IF flywheel 1408 compensate for this phase error to prevent it from affecting cancellation.

To facilitate immediate spur cancellation, the interference cancellation circuit 7-150 may keep a running increment of the spur phase and generate a fine resolution phase step to accommodate for the change in sampling phase at re-start. By polling a status signal of the receiver, the TDD Flywheel 1404 can be configured to enter a mode when the receiver is inactive and exit the mode when the receiver is active. The TDD Flywheel 1404 includes a counter driven by a high speed clock signal, which is always active, for each of the first and second spurs. This counter value when normalized to the high speed clock signal and the sampling clock gives a measure of the phase error. Using this counter value and with the knowledge of the first and second frequency control words FCW1 and FCW2, the phase adjustments for the two spurs can be determined. The phases adjustments are provided to the phase adjust inputs of the respective test signal generators (such as portions of the frequency generator 7-702 of FIG. 7 that generate each of test signals DDS1, DDS2, and DDS3). Thus, the phase adjustments correct for the phase error between the sampling clock and the spurs, and thereby improve cancellation.

In an embodiment that utilizes a Low-IF architecture, the Low-IF TDD Flywheel 1408 provides additional phase correction that compensates for the phase advancement that was missed by a low-IF down-converter. In a Low-IF architecture, a received signal is down-converted to an Intermediate Frequency (IF) band which may have a center frequency between one and two times a channel bandwidth of the received signal.

The TDD Low-IF flywheel 1408 utilizes a counter incremented by a high-speed clock signal similar to the TDD Flywheel 1404. In the TDD Low-IF flywheel 1408, the high-speed clock signal is scaled by an incremental Low-IF phase to generate the TDD Low-IF phase adjustment.

Figure 15:
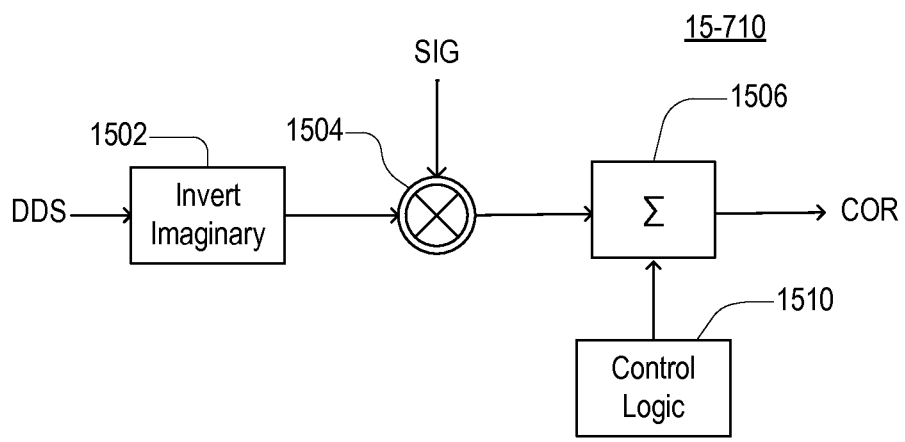
FIG. 15 illustrates a correlator circuit suitable for use in the interference cancellation circuit of FIG. 7 according to an embodiment.

FIG. 15 illustrates a correlator circuit 15-710 suitable for use in the interference cancellation circuit 7-150 of FIG. 7 according to an embodiment. The correlator circuit 15-710 includes an imaginary component inverter 1502, a complex multiplier 1504, an accumulator 1506, and a control logic 1510.

The imaginary component inverter 1502 receives a test signal DDS, such as one of the test signals DDS1, DDS2, and DDS3 of FIG. 7. The test signal DDS includes values having a real and an imaginary component. The imaginary component inverter 1502 multiplies the imaginary component of each complex number by −1 and outputs the resulting complex number. That is, for a value of the test signal DDS having a real component equal to R and an imaginary component equal to 1, the imaginary component inverter 1502 outputs a value having a real component equal to R and an imaginary component equal to −I. The imaginary component inverter 1502 produces output values at a rate equal to a sample rate of an input signal SIG, such as the input signal SIG+SP of FIG. 7.

The complex multiplier 1504 receives the output of the imaginary component inverter 1502 and the input signal SIG, which may correspond to the input signal SIG+SP of FIG. 7. The input signal SIG includes values having a real and an imaginary component.

The complex multiplier 1504 generates output values equal to the product of values of the output of the imaginary component inverter 1502 and values of the input signal SIG. That is, when a value of the output of imaginary component inverter 1502 is represented as a+jc, and a corresponding value of the input signal SIG is represented as b+jd, the corresponding output value of the complex multiplier 1504 may be represented as $(a \cdot b - c \cdot d) \pm j(a \cdot d + c \cdot b)$. The complex multiplier 1504 produces the output values at the rate equal to the sample rate of the input signal SIG.

The accumulator 1506 performs accumulation of the output values of the complex multiplier 1504. The control logic 1510 controls when the accumulator 1506 outputs the accumulated values as values of the correlation signal COR and when the accumulator 1506 starts and stops accumulating.

In an embodiment, the accumulator 1506 outputs one value of the correlation signal COR for each slot of the input signal SIG. In an embodiment, the accumulator 1506 operates to accumulate across multiple separate slots.

In addition to the smart correlator pause option, in an embodiment the correlator outputs are processed by a hybrid Finite Impulse Response (FIR)/Infinite Impulse Response (IIR) filter. A first-order IIR filter is described by $y[n] = \alpha \cdot x[n] + (1-\alpha) \cdot y[n-1]$, wherein $x[n]$ is an $n^{th}$ input, $y[n]$ is an $n^{th}$ output, and $\alpha$ is a filter coefficient. When first starting, there is no value for $y[n-1]$ and as a result IIR filters take some time to 'settle' to the steady-state value.

By dynamically changing the filter coefficient $\alpha$ on each slot, a minimal latency FIR filter that transitions to a first-order IIR may be implemented. For the first slot, the filter coefficient $\alpha=1$. Then for the second slot, the filter coefficient $\alpha=0.5$. For the third slot the filter coefficient $\alpha=0.33$, for the fourth slot the filter coefficient $\alpha=0.25$, and so on. This implements a dynamically optimal FIR filter. When the value of the filter coefficient $\alpha$ reaches a value that is desired for steady-state IIR filtering, the filter coefficient $\alpha$ value is held at that value, thus implementing an IIR response.

Figure 16A:
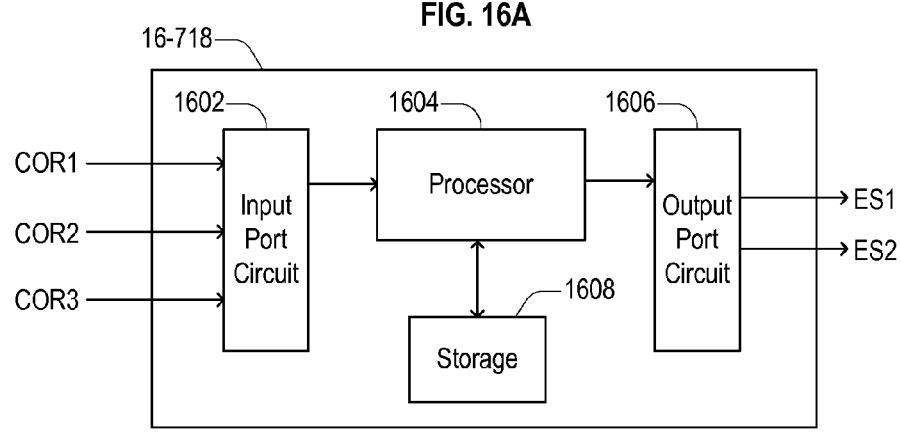
FIG. 16A illustrates a vector separator circuit suitable for use in the interference cancellation circuit of FIG. 7 according to an embodiment.

FIG. 16A illustrates a vector separator circuit 16-718 suitable for use as the vector separator circuit 7-728 in the interference cancellation circuit 7-150 of FIG. 7 according to an embodiment. The vector separator circuit 16-718 includes an input port circuit 1602, a processor 1604, an output port circuit 1606, and a storage circuit 1608.

The input port circuit 1602 receives values of the correlation signals COR1, COR2, and COR3 from other circuits and makes the values available to the processor 1604. In an embodiment, the input port circuit 1602 receives a value of each of the correlation signals COR1, COR2, and COR3 for each slot.

The output port circuit 1606 receives values of the extracted signals ES1 and ES2 from the processor 1604 and provides them to other circuits. In an embodiment, the output port circuit 1606 provides a value of each of the extracted signals ES1 and ES2 for each slot. In an embodiment, the values provided by the output port circuit 1606 during a slot are determined using values received by the input port circuit 1602 during an immediately preceding slot.

The storage circuit 1608 includes a non-transitory computer readable medium in which data and computer programming instruction may be stored, and from which previously-stored data and computer programming instructions may be provided to the processor 1604. The storage circuit 1608 may include on or more of registers, latches, Static Random Access Memory (SRAM), Dynamic Random Access Memory (DRAM), Read-Only Memory (ROM), Flash memory, and the like.

The processor 1604 produces the values of the extracted signals ES1 and ES2 using the received values of the correlation signals COR1, COR2, and COR3 by performing a process stored as computer programming instructions in the storage circuit 1608. The processor may include, for example, a general purpose processor, a digital signal processor, or special purpose processor designed to perform interference cancellation, or the like.

Figure 16B:
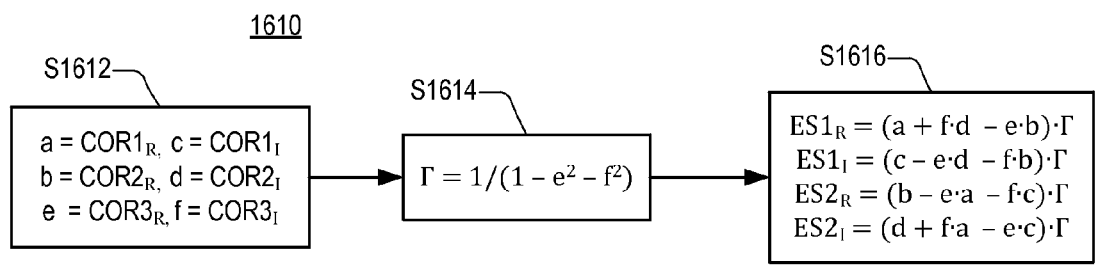
FIG. 16B illustrates a process that may be performed by the vector separator circuit of FIG. 16A according to an embodiment.

FIG. 16B illustrates a process 1610 for vector separation such as may be performed by the processor 1604 of FIG. 16A to produce the values of the extracted signals ES1 and ES2, according to an embodiment.

At S1612, real and imaginary components of values of the correlation signals COR1, COR2, and COR3 are read from the input port circuit 1602 and assigned to variables a through f according to Equation 7, below:

$$a = COR1_R, c = COR1_I,$$

$$b = COR2_I, d = COR2_I,$$

$$e = COR3_R, f = COR3_I \qquad \text{Equation 7}$$

wherein $COR1_R$ is the real component of the first correlation signal COR1, $COR1_I$ is the imaginary component of the first correlation signal COR1, and so forth.

At S1614, a common term F is determined according to Equation 8, below:

$$\Gamma = 1/(1-e^2-f^2) \qquad \text{Equation 8}$$

At S1616, real and imaginary components of values of the extracted signals ES1 and ES2 are determined using Equation 9, below:

$$ES1_R = (a + f \cdot d - e \cdot b) \cdot \Gamma, ES1_I = (c - e \cdot d - f \cdot b) \cdot \Gamma,$$

$$ES2_R = (b - e \cdot a - f \cdot c) \cdot \Gamma, ES2_I = (d + f \cdot a - e \cdot c) \cdot \Gamma \qquad \text{Equation 9}$$

wherein $ES1_R$ is the real component of the first extracted signal ES1, $ES1_I$ is the imaginary component of the first extracted signal ES1, and so forth. The determined values of the extracted signals ES1 and ES2 are then provided to the output port circuit 1606.

FIG. 17 illustrates a process 1700 of interference cancellation according to an embodiment. The process 1700 may be used to process a received signal of a device in order to cancel interference (i.e., spurs) generated by harmonics of one or more clock signals of the device.

At S1702, the process determines one or more harmonics of the clock signals that may generate interference (i.e. that may generate spurs). The harmonics that may generate spurs include harmonics that fall within a channel bandwidth of the received signal.

At S1704, frequencies according to the spurs are determined. The frequencies according to the spurs may include frequencies of the spurs in an input signal created using down-conversion of the received signal.

At S1706, test signals having frequencies equal to the frequencies according to the spurs are generated. In an embodiment, one or more of the test signals corresponds to a sine waveform having a frequency according to the corresponding spur.

At S17-1708, extracted phase and magnitude information for the spurs is generated using the test signals. A process for determining the extracted phase and magnitude information for the spurs according to an embodiment is shown in FIG. 18.

At S1710, reconstructed spur signals are generated using the test signals and the determined phase and magnitude information for the spurs. In an embodiment, a reconstructed spur signal is generated by performing a complex multiplication of a test signal by the extracted phase and magnitude information corresponding to the spur having the frequency of the test signal.

At S1712, the spurs are cancelled by subtracting the reconstructed spur signals from the input signal.

FIG. 18 illustrates a process 18-1708 of determining phases and magnitudes of interfering harmonics in an input signal according to an embodiment. The process 18-1708 may be included in S17-1708 of the process 1700 of FIG. 17.

At S1802, a separation signal is generated according to a frequency difference between first and second test signals. The first and second test signals have frequencies corresponding to frequencies of first and second spurs, respectively. The separation signal corresponds to a sine wave having a frequency equal to the frequency difference between the two test signals.

At S1804, the test signals are correlated with the input signal to generate correlation data according to phases and magnitudes of spurs in the input signal.

At S1806, the separation signal is correlated with $1+j \cdot 0$ to produce a correlated separation signal. The correlated separation signal corresponds to a first relative phase and magnitude response of the second spur into the correlation performed using the first test signal, and by symmetry to a second relative phase and magnitude response of the first spur into the correlation performed using the second test signal.

At S1808, phase and magnitude information for the first and second spur are determined from the correlation data using the correlated separation signal. In an embodiment, the phase and magnitude information for the first and second spur are separated according to Equations 7, 8, and 9, above, wherein the first, second, and third correlation signals COR1, COR2, and COR3 correspond to the correlation data produced using the first test signal, the correlation data produced using the second test signal, and the correlated separation signal, respectively, and the first and second extracted signals ES1 and ES2 correspond to the determined phase and magnitude information of the first and second spur, respectively.

Further aspects of the present invention relate to one or more of the following clauses.

In an embodiment, a circuit comprises a vector separator circuit to generate a first extracted signal according to (i) a first correlation signal, (ii) a second correlation signal, and (iii) a relative response signal. The first correlation signal corresponds to a first correlation between an input signal and a first test signal. The first test signal has a first frequency, and the input signal includes a first spur having the first frequency.

The second correlation signal corresponds to a second correlation between the input signal and a second test signal. The second test signal has a second frequency.

The relative response signal corresponds to a relative response of the second frequency in the first correlation signal. The first extracted signal includes a phase of the first spur and a magnitude of the first spur.

In an embodiment, the vector separator circuit generates the extracted spur signal according to equations $\Gamma = 1/(1-e_2-f_2)$, $ES1_R = (a+f \cdot d-e \cdot b) \cdot \Gamma$, and $ES1_I = (c-e \cdot d-f \cdot b) \cdot \Gamma$, wherein $ES1_R$ is a real component of the first extracted signal, $ES1_I$ is an imaginary component of the first extracted signal, a is a real component of the first correlation signal, b is a real component of the second correlation signal, c is an imaginary component of the first correlation signal, d is an imaginary component of the second correlation signal, e is a real component of the relative response signal, c is an imaginary component of the f relative response signal, and $\Gamma$ is a common factor.

In an embodiment, the input signal includes a second spur having the second frequency, and the vector separator circuit is further to generate a second extracted signal according to equations $ES2_R = (b-e \cdot a-f \cdot c) \cdot \Gamma$ and $ES2_I = (d+f \cdot a-e \cdot c) \cdot \Gamma$, wherein $ES2_R$ is a real component of the second extracted signal and $ES2_I$ is an imaginary component of the second extracted signal. The second extracted signal includes a phase of the second spur and a magnitude of the second spur.

In an embodiment, the circuit further comprises a correlator circuit to generate the relative response signal by correlating a third test signal with a constant. The third test signal has a third frequency, and the third frequency is substantially equal to a difference between the first frequency and the second frequency.

In an embodiment, the first frequency is a harmonic of a first clock signal, and the second frequency is a harmonic of a second clock signal.

In an embodiment, the input signal is produced by down-converting a received signal using a local oscillator signal, and the local oscillator signal is generated using the first clock signal.

In an embodiment, the first clock signal is generated according to the second clock signal and frequency correction information.

In an embodiment, the circuit further comprises a correlator circuit to generate the first correlation signal by correlating the first test signal with the input signal. The correlator circuit is to generate a value of the first correlation signal using values of a plurality of separated slots of the input signal.

In an embodiment, the circuit further comprises a multiplier circuit to generate a reconstructed signal using the first extracted signal and the first test signal, and a summing circuit to subtract the reconstructed signal from the input signal.

In an embodiment, the circuit further comprises a frequency generator circuit to produce the first and second test signals, and a flywheel circuit to provide start and stop signals to the frequency generator circuit according to no-data periods of the input signal.

In an embodiment, a method is performed by a receiver for cancelling interference. The method comprises generating a first correlation signal by correlating an input signal with a first test signal. The first test signal has a first frequency, and the input signal includes a first spur having the first frequency.

The method further comprises generating a second correlation signal by correlating the input signal with a second test signal. The second test signal has a second frequency.

The method further comprises generating a relative response signal according to a difference between the first frequency and the second frequency, and generating a first extracted signal using (i) the first correlation signal, (ii) the second correlation signal, and (iii) the relative response signal. The first extracted signal includes a phase of the first spur and a magnitude of the first spur.

In an embodiment, the first extracted signal is generated according to equations $\Gamma=1/(1-e^2-f^2)$, $ES1_R=(a+f \cdot d-e \cdot b) \cdot \Gamma$, and $ES1_I=(c-e \cdot d-f \cdot b) \cdot \Gamma$, wherein $ES1_R$ is a real component of the first extracted signal, $ES1_I$ is an imaginary component of the first extracted signal, a is a real component of the first correlation signal, b is a real component of the second correlation signal, c is an imaginary component of the first correlation signal, d is an imaginary component of the second correlation signal, e is a real component of the relative response signal, c is an imaginary component of the relative response signal, and $\Gamma$ is a common factor.

In an embodiment, the method further comprises generating a second extracted signal according to equations $ES2_R=(b-e \cdot a-f \cdot c) \cdot \Gamma$ and $ES2_I=(d+f \cdot a-e \cdot c) \cdot \Gamma$, wherein $ES2_R$ is a real component of the second extracted signal and $ES2_I$ is an imaginary component of the second extracted signal. The input signal includes a second spur having the second frequency, and the second extracted signal includes a phase of the second spur and a magnitude of the second spur.

In an embodiment, the method further comprises generating the relative response signal by correlating a third test signal with a constant. The third test signal has a frequency substantially equal to the difference between the first frequency and the second frequency.

In an embodiment, the first frequency is a harmonic of a clock signal.

In an embodiment, the method further comprises generating a local oscillator signal using the clock signal, and generating the input signal by down-converting a received signal using the local oscillator signal.

In an embodiment, the method further comprises determining the first frequency according to a frequency of the clock signal and frequency characteristics of the received signal.

In an embodiment, the method further comprises generating a value of the first correlation signal by correlating values of a plurality of separated slots of the input signal.

In an embodiment, the method further comprises generating a reconstructed signal according to the first extracted signal and the first test signal, and subtracting the reconstructed signal from the input signal.

In an embodiment, the method further comprises starting and stopping the generation of the first test signal according to a no-data period of the input signal.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A circuit of a receiver, the circuit comprising:
   a vector separator circuit to generate a first extracted signal according to (i) a first correlation signal, (ii) a second correlation signal, and (iii) a relative response signal; and
   a correlator circuit to generate the first correlation signal by correlating a first test signal with an input signal, the first test signal having a first frequency and the input signal including a first spur having the first frequency,
   wherein the second correlation signal corresponds to a second correlation between the input signal and a second test signal, the second test signal having a second frequency,
   wherein the relative response signal corresponds to a relative response of the second frequency in the first correlation signal, and
   wherein the first extracted signal includes a phase of the first spur and a magnitude of the first spur for faster interference cancellation.

2. The circuit of claim 1, wherein the vector separator circuit generates the first extracted signal based on:

$\Gamma=1/(1-e^2-f^2)$, $ES1_R=(a+f \cdot d-e \cdot b) \cdot \Gamma$, $ES1_I=(c-e \cdot d-f \cdot b) \cdot \Gamma$, wherein $ES1_R$ is a real component of the first extracted signal, $ES1_I$ is an imaginary component of the first extracted signal, a is a real component of the first correlation signal, b is a real component of the second correlation signal, c is an imaginary component of the first correlation signal, d is an imaginary component of the second correlation signal, e is a real component of the relative response signal, f is an imaginary component of the relative response signal, and $\Gamma$ is a common factor.

3. The circuit of claim 2, wherein the input signal includes a second spur having the second frequency, and the vector separator circuit is further to generate a second extracted signal based on:

$ES2_R=(b-e \cdot a-f \cdot c) \cdot \Gamma$, $ES2_I=(d+f \cdot a-e \cdot c) \cdot \Gamma$, wherein $ES2_R$ is a real component of the second extracted signal and $ES2_I$ is an imaginary component of the second extracted signal, and
   wherein the second extracted signal includes a phase of the second spur and a magnitude of the second spur.

4. The circuit of claim 1, wherein the correlator circuit is a first correlator circuit, the circuit of claim 1 further comprising:
   a second correlator circuit to generate the relative response signal by correlating a third test signal with a constant, the third test signal having a third frequency,
   wherein the third frequency is substantially equal to a difference between the first frequency and the second frequency.

5. The circuit of claim 1, wherein the first frequency is a harmonic of a first clock signal, and wherein the second frequency is a harmonic of a second clock signal.

6. The circuit of claim 5, wherein the input signal is produced by down-converting a received signal using a local oscillator signal, and
   wherein the local oscillator signal is generated using the first clock signal.

7. The circuit of claim 5, wherein the first clock signal is generated according to the second clock signal and frequency correction information.

8. The circuit of claim 1,
wherein the correlator circuit is to generate a value of the first correlation signal using values of a plurality of separated slots of the input signal.

9. The circuit of claim 1, further comprising:
a multiplier circuit to generate a reconstructed signal using the first extracted signal and the first test signal; and
a summing circuit to subtract the reconstructed signal from the input signal.

10. The circuit of claim 1, further comprising:
a frequency generator circuit to produce the first and second test signals; and
a flywheel circuit to provide start and stop signals to the frequency generator circuit according to no-data periods of the input signal.

11. A method performed by a receiver for cancelling interference, the method comprising:
generating, by the receiver, a first correlation signal by correlating an input signal with a first test signal, the first test signal having a first frequency, and the input signal including a first spur having the first frequency;
generating, by the receiver, a second correlation signal by correlating the input signal with a second test signal, the second test signal having a second frequency;
generating, by the receiver, a relative response signal according to a difference between the first frequency and the second frequency; and
generating, by the receiver, a first extracted signal using (i) the first correlation signal, (ii) the second correlation signal, and (iii) the relative response signal,
wherein the first extracted signal includes a phase of the first spur and a magnitude of the first spur for faster interference cancellation.

12. The method of claim 11, wherein the first extracted signal is generated based on:

$$\Gamma = 1/(1-e^2-f^2),$$

$$ES1_R = (a + f \cdot d - e \cdot b) \cdot \Gamma, \quad ES1_I = (c - e \cdot d - f \cdot b) \cdot \Gamma,$$

wherein $ES1_R$ is a real component of the first extracted signal, $ES1_I$ is an imaginary component of the first extracted signal, a is a real component of the first correlation signal, b is a real component of the second correlation signal, c is an imaginary component of the first correlation signal, d is an imaginary component of the second correlation signal, e is a real component of the relative response signal, f is an imaginary component of the relative response signal, and $\Gamma$ is a common factor.

13. The method of claim 12, the method further comprising:
generating a second extracted signal based on:

$$ES2_R = (b - e \cdot a - f \cdot c) \cdot \Gamma, \quad ES2_I = (d + f \cdot a - e \cdot c) \cdot \Gamma,$$

wherein $ES2_R$ is a real component of the second extracted signal and $ES2_I$ is an imaginary component of the second extracted signal,
wherein the input signal includes a second spur having the second frequency, and
wherein the second extracted signal includes a phase of the second spur and a magnitude of the second spur.

14. The method of claim 11, further comprising:
generating the relative response signal by correlating a third test signal with a constant,
wherein the third test signal has a frequency substantially equal to the difference between the first frequency and the second frequency.

15. The method of claim 11, wherein the first frequency is a harmonic of a clock signal.

16. The method of claim 15, further comprising:
generating a local oscillator signal using the clock signal; and
generating the input signal by down-converting a received signal using the local oscillator signal.

17. The method of claim 15, further comprising:
determining the first frequency according to a frequency of the clock signal and frequency characteristics of the received signal.

18. The method of claim 11, further comprising:
generating a value of the first correlation signal by correlating values of a plurality of separated slots of the input signal.

19. The method of claim 11, further comprising:
generating a reconstructed signal according to the first extracted signal and the first test signal; and
subtracting the reconstructed signal from the input signal.

20. The method of claim 11, further comprising starting and stopping the generation of the first test signal according to a no-data period of the input signal.

* * * * *